United States Patent [19]

Kosuge

[11] Patent Number: 4,749,211

[45] Date of Patent: Jun. 7, 1988

[54] SUPPORTING STRUCTURE FOR A SHIFT-CONTROL APPARATUS OF A FOUR WHEELED BUGGY HAVING A STEERING WHEEL

[75] Inventor: Hideyoshi Kosuge, Hyogo, Japan

[73] Assignee: Kawasaki Jukogyo Kabushiki Kaisha, Kobe, Japan

[21] Appl. No.: 67,953

[22] Filed: Jun. 30, 1987

[30] Foreign Application Priority Data

Jul. 1, 1986 [JP] Japan ..................... 61-101029[U]

[51] Int. Cl.⁴ .............................................. B62D 1/02
[52] U.S. Cl. .................................... 280/779; 180/908
[58] Field of Search ............... 280/779, 780, 781, 281,
280/282, DIG. 5, 696, 701; 180/215, 216, 217,
73.2, 73.3, 73.4, 58, 60, 62, 908

[56] References Cited

U.S. PATENT DOCUMENTS 2,507,421  5/1950  Rose ..................................... 180/217
3,403,927 10/1968  Rettger ................................ 280/282

FOREIGN PATENT DOCUMENTS 677816  6/1939  Fed. Rep. of Germany ...... 180/216
183027 12/1979  Japan .
152626 11/1980  Japan .

Primary Examiner—John J. Love
Assistant Examiner—Karin L. Ferriter
Attorney, Agent, or Firm—Leydit, Voit & Mayer

[57] ABSTRACT

A supporting structure for a shift-control apparatus of a four wheeled buggy having a main frame and a steering wheel operated by a driver from a sitting posture, comprising a lower pipe, a pair of suspension pipes, an upper pipe, a pair of steering column pipes, a bracket supporting pipe, and brackets for supporting a shift-control apparatus, whereby the shift-control apparatus can be arranged in a central position of the main frame to facilitate the driver's manipulation with respect to a shift lever of the shift-control apparatus and to facilitate and simplify the wiring operation of a operation cable for a control system and electric wires for an electric system.

4 Claims, 3 Drawing Sheets

SUPPORTING STRUCTURE FOR A SHIFT-CONTROL APPARATUS OF A FOUR WHEELED BUGGY HAVING A STEERING WHEEL

BACKGROUND OF THE INVENTION

1. Field of the Invention

The present invention relates to a four wheeled buggy used for the purpose of carrying a load or burden, for example, in a pasture, farm-land, waste land and the like, and more particularly, it relates to a supporting structure for a shift-control apparatus of a four wheeled buggy having a steering wheel operated by a driver from a stirring posture.

2. Description of the Related Art

Recently, as small-sized or light vehicles adapted to run on a pasture, farm-land, waste land and the like, three wheeled or four wheeled buggies have been developed. These three of four wheeled buggies are operated by a driver from a riding posture, like an auto cycle or bike, and the steering control thereof is effected by manual operation of the driver by means of a bar handle of the buggy.

However, the above conventional buggy of riding type has disadvantages that it is hard for the driver to get on and off the buggy and that, when the buggy runs on such an irregular land as the pasture, farm-land, waste land and the like, the driver is obliged to heavy labor due to serious and hard manipulation of the bar handle, thus tiring the driver in a long-driving. Further, the above conventional buggy has a poor loading capacity and does not permit a double-seater.

To eliminate the drawbacks of the above-mentioned conventional buggy, a four wheeled buggy having a steering wheel operated by a driver from a sitting posture has recently been proposed.

However, in the above-mentioned four wheeled buggy operated by the driver from the sitting posture, a floor in front of seats on which the driver and a passenger sit must be flat and an upper space above the flat floor must be completely vacant so as not to hinder the driver's operation and so as to facilitate their getting on and off with respect to the buggy. Therefore, a shift-control apparatus should not be arranged on the floor. Further, an operation or control cable for connecting the shift-control apparatus with a front-rear drive changing transmission positioned in the rear part of the buggy must not be arranged on the flat floor so as not to hinder the driver's and/or the passenger's getting on and off with respect to the buggy. Furthermore, the control or operation cable must not be arranged below the flat floor so as to avoid the damage of the cable even when the buggy runs on the irregular land on the bound. Therefore, it is requested that the operation cable is arranged between the front part and the rear part of the buggy in a space equal to or smaller than a hight or thickness of a main frame of the buggy. In this case, it is preferable to provide such space in a central and longitudinal portion of the main frame to simplify the wiring of the operation cable and electric wires for an electric system. Accordingly, it is requested that the shift-control apparatus is arranged in a position which corresponds to such space and which facilitates the driver's operation.

Accordingly, an object of the present invention is to provide a supporting structure for a shift-control apparatus of a four wheeled buggy capable of supporting the shift-control apparatus in a position which facilitates the driver's operation and which also facilitates introduction of an operation cable into a wiring space provided in a central and longitudinal portion of a main frame of the buggy.

SUMMARY OF THE INVENTION

In order to solve the above problems, according to the invention, there is provided an improved supporting structure for supporting a shift-control apparatus of a four wheeled buggy having a main frame of flat bench type and a steering wheel operated by a driver from a sitting posture, comprising: an inverted U-shaped lower pipe inclined forwardly and uprightly fixed to a front part of said main frame, said lower pipe having an upper straight portion and bent portions situated on both ends of said upper straight portion; a pair of suspension pipes connected to said main frame and to said upper straight portion of said lower pipe, each of said suspension pipes being connected to said upper straight portion at points spaced apart each other; an inverted U-shaped upper pipe uprightly connected to said bent portions of the upper straight portion of the lower pipe in such a way that it is inclined rearwardly of said lower pipe; a pair of steering column pipes connected to an upper portion of said upper pipe at intermediate points spaced apart each other and to said upper straight portion of said lower pipe at intermediate points spaced apart each other; a bracket supporting pipe connected to and bridged between lower portions of said steering column pipes; and, supporting brackets for supporting a shift-control apparatus, connected to and bridged between a central portion of said bracket supporting pipe and a central portion of said upper pipe.

According to the supporting structure of the shift-control apparatus having the above-mentioned construction, since the shift-control apparatus is arranged in a central position in front of a driver's seat, if the steering wheel of the steering apparatus is positioned either right or left in front of the seat, the driver can manipulate the shift lever of the shift-control apparatus by his left or right hand so long as he sits on right side or left side of the seat. Further, since the shift-control apparatus is arranged in the central position in front of the seat, the operation cable connected to the shift lever of the shift-control apparatus can directly be introduced into the wiring space or passage provided in the central and longitudinal portion of the main frame, thus facilitating and simplifying the wiring operation of the control or operation cable.

DETAILED DESCRIPTION OF THE PREFERRED EMBODIMENT

Figure 1:
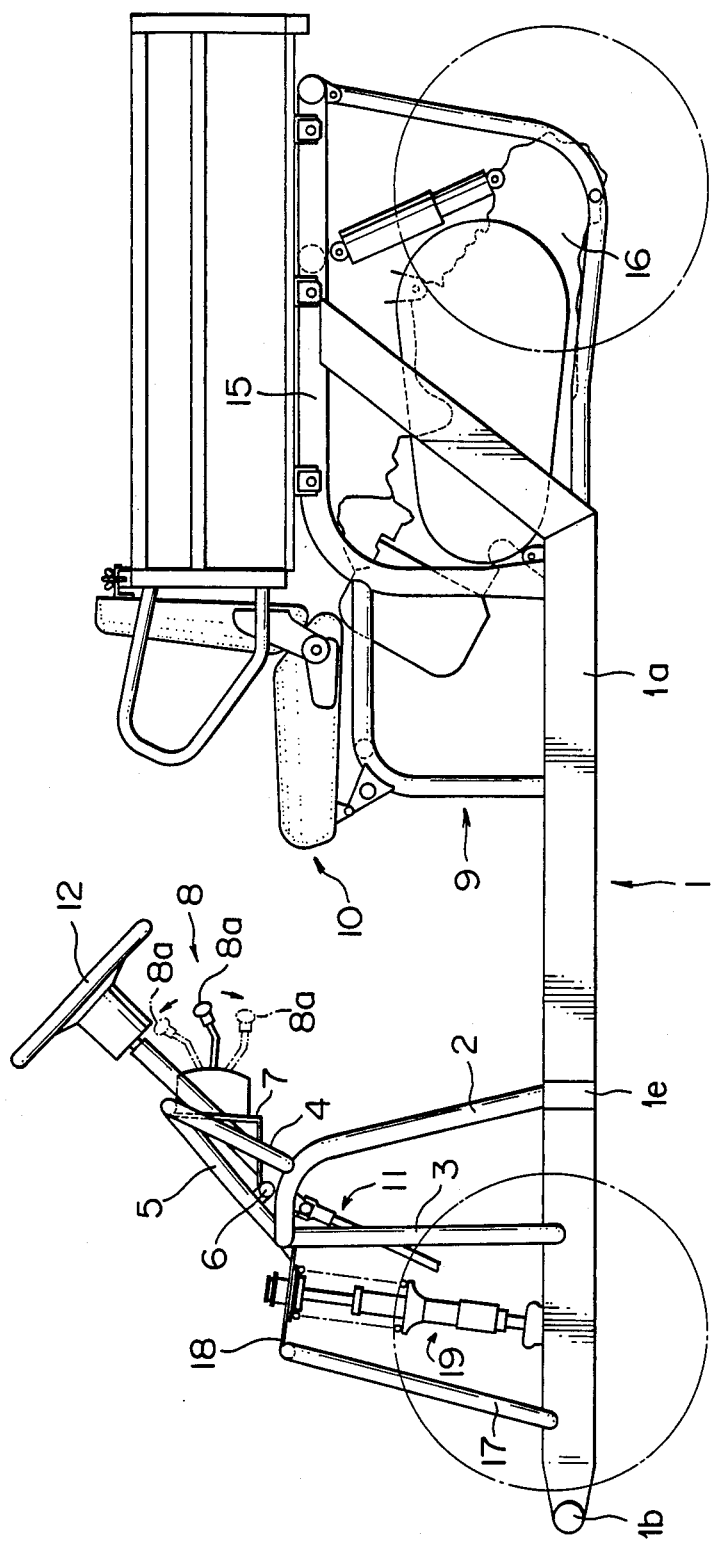
FIG. 1 is a simplified elevational view of a four wheeled buggy operated by a driver from a sitting posture, having a supporting structure for a shift-control apparatus according to the present invention.
Figure 2:
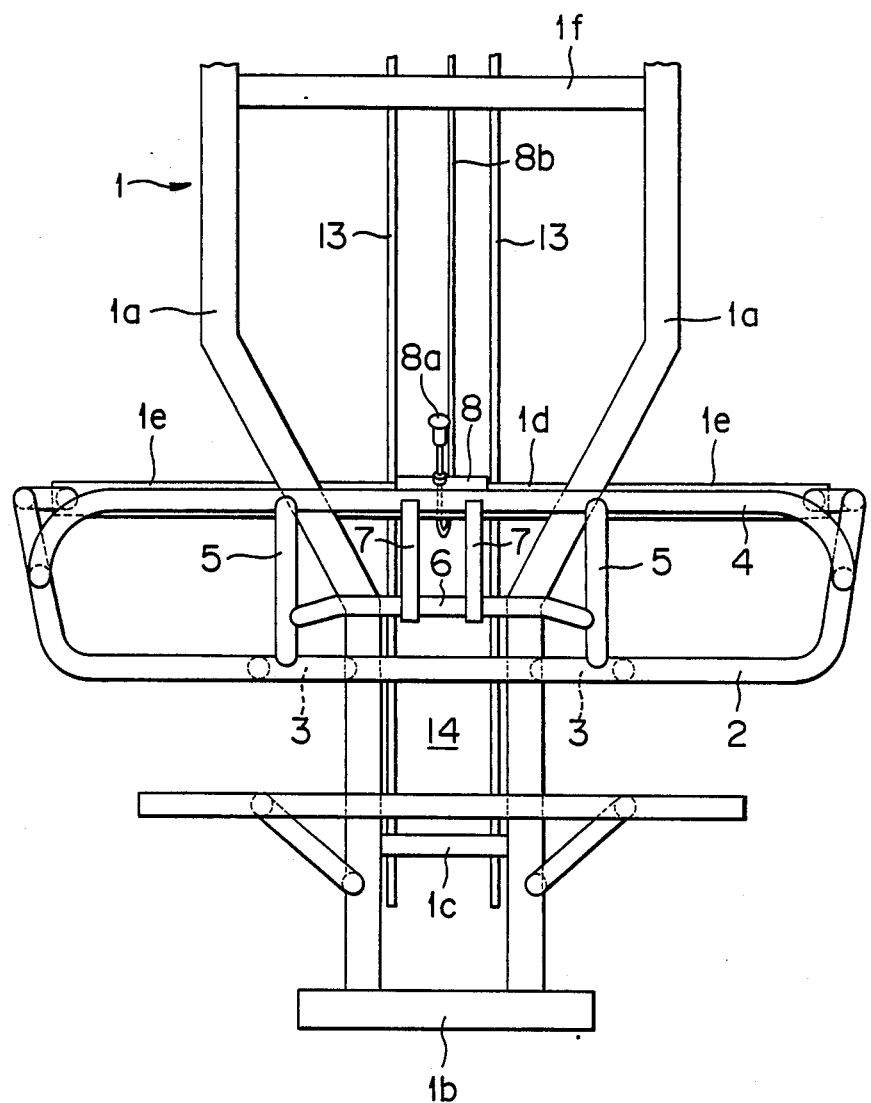
FIG. 2 is a plan view of the supporting structure for the shift-control apparatus according to the present invention.
Figure 3:
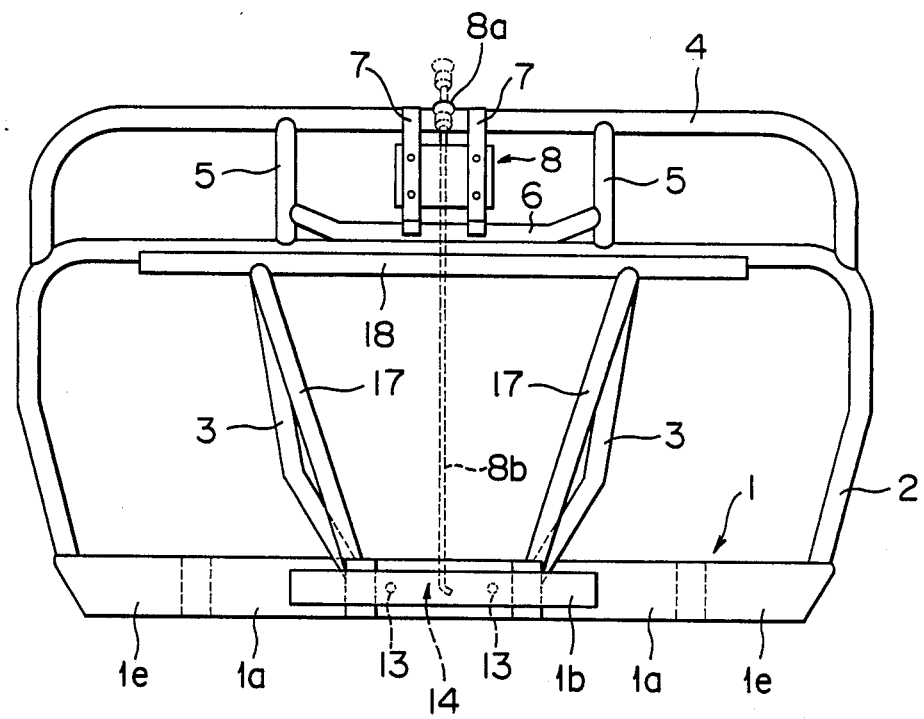
FIG. 3 is an elevational end view of the supporting structure shown in FIG. 2.

The present invention will now be explained with reference to the drawings. FIG. 1 is a simplified elevational view of a four wheeled buggy operated by a driver from a sitting posture incorporating a supporting structure for a shift-control apparatus according to a preferred embodiment of the present invention. The four wheeled buggy shown in FIG. 1 includes a main frame 1 forming a flat bench comprising a pair of side pipes 1a, front parts of which are symmetrically approached to each other, as shown in FIG. 2, to form a front narrower portion. The main frame 1 further comprises a front cross pipe 1b connected to front ends of the side pipes 1a of the narrower portion of the main frame 1, an intermediate cross pipe 1c connected to intermediate portions of the side pipes 1a of the narrower portion of the main frame, a cross pipe 1d connected to the side pipes 1a behind said narrower portion, a pair of projecting pipes 1e fixed to the corresponding side pipes 1a in such a way that they protrude laterally from the side pipes and are registered with the cross pipe 1d, and a rear cross pipe if connected to the side pipes 1a at a rear part of the main frame. A portal lower pipe 2 which is inclined forwardly and has an upper portion bent in a horizontal direction is attached to free ends of the projecting pipes 1e. A pair of suspension pipes 3 are uprightly attached to the side pipes 1a in the narrower portion of the main frame 1 and the also attached to an intermediate portion of the horizontal upper portion of the lower pipe 2 at points spaced apart each other. A portal upper pipe 4 which is inclined rearwardly is connected to bent portions situated on both sides of the horizontal upper portion of the lower pipe 2. A pair of steering column pipes 5 are connected to an upper portion of the upper pipe 4 at intermediate points spaced apart each other and are also connected to the upper portion of the lower pipe 2 at intermediate points spaced apart each other. A horizontal bracket supporting pipe 6 which is slightly bent rearwardly and slightly inclined downwardly is bridged between lower portions of the steering column pipes 5. A pair of brackets 7 comprising two L-angled plates (FIG. 1) are fixed to and bridged between a central portion of the bracket supporting pipe 6 and a central portion of the upper pipe 4, as shown in FIG. 3. A shift-control apparatus 8 is fixed to and supported on the brackets 7.

In the supporting structure for the shift-control apparatus having the above-mentioned construction, since the shift-control apparatus 8 can be arranged in a central position in front of a seat fitting frame 9, if a steering wheel 12 of a steering apparatus 11 is positioned either left or right in front of a seat 10 attached to the seat fitting frame 9, so long as the drive sits on left side or right side of the seat 10, he can manipulate a shift-lever 8a of the shift-control apparatus 8 by his right or left hand to easily change or shift the shift lever in any one of front-drive, neutral and rear-drive positions. Further, since the shift-control apparatus 8 is arranged in the central position in front of the seat 10 as described above, an operation cable 8b connected to the shift lever 8a can be directly introduced into a wiring passage 14 defined between two parallel pipes 13 extending from the interior of the front narrower portion of the main frame 1 to a rear part of the vehicle, as shown in FIG. 2. The operation cable 8b introduced into the wiring passage 14, as well as electric wires for an electric system, is extended to the rear part of the main frame 1, and these operation cable and electric wires are connected to a front-rear drive changing transmission 16 (FIG. 1) supported by a rear frame 15.

Lastly, between the suspension pipes 3 of the supporting structure according to the present invention and a pair of suspension pipes 17 provided in front of the suspension pipes 3, a pair of brackets 18 are bridged, on which cushions or shock absorbers 19 are mounted.

As can be understood from the afore-mentioned explanation, in accordance with the supporting structure for the shift-control apparatus of the four wheeled buggy operated by the driver from the sitting posture according to the present invention, since the shift-control apparatus is arranged in the central position in front of the seat, the driver can easily manipulate the shift lever to shift the lever in any one of front-drive, neutral and rear-drive positions. Further, since the operation cable connected to the shift-lever of the shift-control apparatus arranged in the central position in front of the seat can be directly introduced into the wiring passage formed in the central and longitudinal position of the main frame, the wiring operation of the operation cable is facilitated and simplified.

What is claimed is:

1. A supporting structure for supporting a shift-control apparatus of a four wheeled buggy having a main frame of flat bench type and a steering wheel operated by a driver from a sitting posture, comprising:
   an inverted U-shaped lower pipe inclined forwardly and uprightly fixed to a front part of said main frame, said lower pipe having an upper straight portion and bent portions situated on both ends of said upper straight portion;
   a pair of suspension pipes connected to said main frame and to said upper straight portion of said lower pipe, each of said suspension pipes being connected to said upper straight portion at points spaced apart each other;
   an inverted U-shaped upper pipe uprightly connected to said bent portions of the upper straight portion of the lower pipe in such a way that it is inclined rearwardly of said lower pipe;
   a pair of steering column pipes connected to an upper portion of said upper pipe at intermediate points spaced apart each other and to said upper straight portion of said lower pipe at intermediate points spaced apart each other;
   a bracket supporting pipe connected to and bridged between lower portions of said steering column pipes; and,
   supporting brackets for supporting a shift-control apparatus, connected to and bridged between a central portion of said bracket supporting pipe and a central portion of said upper pipe.

2. A supporting structure according to claim 1, wherein said main frame includes a pair of projecting pipes projecting laterally from the main frame at a front part thereof, and said lower pipe is connected to free ends of said projecting pipes.

3. A supporting structure according to claim 1, wherein said pair of suspension pipes and said pair of steering column pipes are arranged symmetrically with respect to a longitudinal center line of said main frame.

4. A supporting structure according to claim 1 further comprises a pair of second suspension pipes uprightly arranged on the main frame in front of the first-mentioned suspension pipes, and wherein a pair of brackets for supporting shock absorbers are bridged between said two pairs of suspension pipes.

* * * * *